US011465698B2

(12) United States Patent
Ellifson et al.

(10) Patent No.: US 11,465,698 B2
(45) Date of Patent: Oct. 11, 2022

(54) STABILIZER BAR FOR A LOAD SPAN TAG AXLE

(71) Applicant: Oshkosh Corporation, Oshkosh, WI (US)

(72) Inventors: Erik S. Ellifson, Oshkosh, WI (US); Jason J. Zuleger, Appleton, WI (US); Steve Volkman, Ohskosh, WI (US); Ryan Wolf, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/180,423

(22) Filed: Feb. 19, 2021

(65) Prior Publication Data
US 2021/0276643 A1    Sep. 9, 2021

Related U.S. Application Data

(60) Provisional application No. 62/987,017, filed on Mar. 9, 2020.

(51) Int. Cl.
*B62D 61/12* (2006.01)
*B60B 35/00* (2006.01)
(Continued)

(52) U.S. Cl.
CPC ............ *B62D 61/12* (2013.01); *B60B 35/007* (2013.01); *B60G 17/00* (2013.01); *B60G 21/005* (2013.01);
(Continued)

(58) Field of Classification Search
CPC ...... B62D 61/12; B60B 35/007; B60G 17/00; B60G 21/005; B60G 2204/416; B60G 21/055
See application file for complete search history.

(56) References Cited

U.S. PATENT DOCUMENTS 3,589,700 A * 6/1971 Ruet .................... B60G 17/021
280/5.515
5,597,174 A * 1/1997 Christenson ............. B60G 5/04
180/209
(Continued)

FOREIGN PATENT DOCUMENTS

EP         0547945 A1 *  6/1993    ......... B60G 21/0551
KR      100476252 B1 *  3/2005

(Continued)

OTHER PUBLICATIONS

Machine Translation of WO2016041703 (Year: 2016).*
(Continued)

*Primary Examiner* — Paul N Dickson
*Assistant Examiner* — Kurtis Nielson
(74) *Attorney, Agent, or Firm* — Foley & Lardner LLP

(57) ABSTRACT

A tag axle system for a concrete mixing vehicle including an axle including a right wheel assembly and a left wheel assembly, an actuator coupled to the axle to move the axle between a raised position and a lowered position relative to a vehicle chassis, a stabilizer mount plate structured to be coupled to the vehicle chassis, a stabilizer bar rotationally coupled to the stabilizer mount plate, a right stabilizer bar arm rigidly coupled to the stabilizer bar and coupled to the right wheel assembly, and a left stabilizer bar arm rigidly coupled to the stabilizer bar and coupled to the left wheel assembly.

15 Claims, 12 Drawing Sheets

(51) Int. Cl.
  *B60G 17/00* (2006.01)
  *B60G 21/00* (2006.01)
(52) U.S. Cl.
  CPC .... *B60G 2204/41* (2013.01); *B60G 2204/416* (2013.01); *B60G 2500/30* (2013.01)

(56) References Cited

U.S. PATENT DOCUMENTS

| | | | |
|---|---|---|---|
| 5,833,026 A * | 11/1998 | Zetterstrom | B60G 3/202 180/360 |
| 6,189,901 B1 * | 2/2001 | Smith | B60G 9/00 180/209 |
| 6,311,993 B1 * | 11/2001 | Hulstein | B60G 11/27 280/86.5 |
| 6,516,914 B1 | 2/2003 | Andersen et al. | |
| 6,561,718 B1 | 5/2003 | Archer et al. | |
| 6,669,303 B2 * | 12/2003 | Dodd | B60G 9/00 180/209 |
| 6,764,085 B1 | 7/2004 | Anderson | |
| 6,779,806 B1 | 8/2004 | Breitbach et al. | |
| 6,883,815 B2 | 4/2005 | Archer | |
| 6,976,688 B2 | 12/2005 | Archer et al. | |
| 7,207,582 B2 | 4/2007 | Siebers et al. | |
| 7,398,981 B1 * | 7/2008 | Ener | B62D 61/12 280/43.17 |
| 7,472,914 B2 | 1/2009 | Anderson et al. | |
| 8,333,390 B2 | 12/2012 | Linsmeier et al. | |
| 8,465,025 B2 | 6/2013 | Venton-Walters et al. | |
| 8,523,202 B1 * | 9/2013 | Strong | B60G 17/005 280/86.5 |
| 8,523,203 B1 * | 9/2013 | Strong | B60G 5/01 280/86.5 |
| 8,596,648 B2 | 12/2013 | Venton-Walters et al. | |
| 8,764,029 B2 | 7/2014 | Venton-Walters et al. | |
| 8,801,017 B2 | 8/2014 | Ellifson et al. | |
| 8,821,130 B2 | 9/2014 | Venton-Walters et al. | |
| 8,876,133 B2 | 11/2014 | Ellifson | |
| 8,955,859 B1 | 2/2015 | Richmond et al. | |
| 8,955,880 B2 | 2/2015 | Malcolm et al. | |
| 8,991,834 B2 | 3/2015 | Venton-Walters et al. | |
| 8,991,840 B2 | 3/2015 | Zuleger et al. | |
| 9,016,703 B2 | 4/2015 | Rowe et al. | |
| 9,045,014 B1 | 6/2015 | Verhoff et al. | |
| 9,127,738 B2 | 9/2015 | Ellifson et al. | |
| 9,174,686 B1 | 11/2015 | Messina et al. | |
| 9,291,230 B2 | 3/2016 | Ellifson et al. | |
| 9,303,715 B2 | 4/2016 | Dillman et al. | |
| 9,327,576 B2 | 5/2016 | Ellifson | |
| 9,329,000 B1 | 5/2016 | Richmond et al. | |
| 9,434,321 B2 | 9/2016 | Perron et al. | |
| 9,581,153 B2 | 2/2017 | Venton-Walters et al. | |
| 9,656,640 B1 | 5/2017 | Verhoff et al. | |
| 9,669,679 B2 | 6/2017 | Zuleger et al. | |
| 9,688,112 B2 | 6/2017 | Venton-Walters et al. | |
| 9,707,869 B1 | 7/2017 | Messina et al. | |
| 9,718,507 B2 * | 8/2017 | Ricketts | A01D 41/02 |
| 9,764,613 B2 | 9/2017 | Rowe et al. | |
| 9,765,841 B2 | 9/2017 | Ellifson et al. | |
| 9,809,080 B2 | 11/2017 | Ellifson et al. | |
| 9,890,024 B2 | 2/2018 | Hao et al. | |
| 9,944,145 B2 | 4/2018 | Dillman et al. | |
| 10,030,737 B2 | 7/2018 | Dillman et al. | |
| 10,144,389 B2 | 12/2018 | Archer et al. | |
| 10,167,027 B2 | 1/2019 | Perron et al. | |
| 10,221,055 B2 | 3/2019 | Hao et al. | |
| 10,350,956 B2 | 7/2019 | Dillman et al. | |
| 10,369,860 B2 | 8/2019 | Ellifson et al. | |
| 10,392,056 B2 | 8/2019 | Perron et al. | |
| 10,407,288 B2 | 9/2019 | Hao et al. | |
| 10,421,332 B2 | 9/2019 | Venton-Walters et al. | |
| 10,422,403 B2 | 9/2019 | Ellifson et al. | |
| 10,434,995 B2 | 10/2019 | Verhoff et al. | |
| 10,464,389 B2 | 11/2019 | Zuleger et al. | |
| 10,611,203 B1 | 4/2020 | Rositch et al. | |
| 10,611,204 B1 | 4/2020 | Zhang et al. | |
| 10,619,696 B2 | 4/2020 | Dillman et al. | |
| 10,632,805 B1 | 4/2020 | Rositch et al. | |
| 10,723,282 B2 | 7/2020 | Perron et al. | |
| 10,752,075 B1 | 8/2020 | Shukla et al. | |
| 10,759,251 B1 * | 9/2020 | Zuleger | B60G 21/055 |
| 10,934,145 B2 | 3/2021 | Hao et al. | |
| 10,940,728 B2 | 3/2021 | Rositch et al. | |
| 10,953,939 B2 | 3/2021 | Zuleger et al. | |
| 10,974,561 B2 | 4/2021 | Dillman et al. | |
| 10,981,538 B2 | 4/2021 | Archer et al. | |
| 11,027,606 B2 | 6/2021 | Wildgrube et al. | |
| 11,034,206 B2 | 6/2021 | Zuleger | |
| 2008/0234118 A1 | 11/2008 | Venton-Walters et al. | |
| 2009/0174158 A1 | 7/2009 | Anderson et al. | |
| 2011/0079978 A1 | 4/2011 | Schreiner et al. | |
| 2011/0114409 A1 | 5/2011 | Venton-Walters | |
| 2017/0297425 A1 | 10/2017 | Wildgrube et al. | |
| 2018/0001839 A1 | 1/2018 | Perron et al. | |
| 2019/0178329 A1 | 6/2019 | Dumitru et al. | |
| 2019/0185077 A1 | 6/2019 | Smith et al. | |
| 2019/0276102 A1 * | 9/2019 | Zuleger | B60G 17/08 |
| 2019/0308480 A1 | 10/2019 | Dillman et al. | |
| 2019/0316650 A1 | 10/2019 | Dillman et al. | |
| 2019/0337348 A1 | 11/2019 | Venton-Walters et al. | |
| 2019/0337350 A1 | 11/2019 | Ellifson et al. | |
| 2019/0338823 A1 | 11/2019 | Ellifson et al. | |
| 2019/0344838 A1 | 11/2019 | Perron et al. | |
| 2019/0352157 A1 | 11/2019 | Hao et al. | |
| 2020/0062071 A1 | 2/2020 | Zuleger et al. | |
| 2020/0223276 A1 | 7/2020 | Rositch et al. | |
| 2020/0223277 A1 | 7/2020 | Zhang et al. | |
| 2020/0232533 A1 | 7/2020 | Dillman et al. | |
| 2020/0384823 A1 | 12/2020 | Shukla et al. | |
| 2021/0088036 A1 | 3/2021 | Schubart et al. | |
| 2021/0107361 A1 | 4/2021 | Linsmeier et al. | |
| 2021/0155063 A1 | 5/2021 | Rositch et al. | |
| 2021/0155463 A1 | 5/2021 | Hao et al. | |
| 2021/0171137 A1 | 6/2021 | Zuleger et al. | |

FOREIGN PATENT DOCUMENTS

| | | | |
|---|---|---|---|
| KR | 101427945 B1 * | 8/2014 | |
| WO | WO-2004000584 A1 * | 12/2003 | B60G 17/033 |
| WO | WO-2016041703 A1 * | 3/2016 | B60G 7/02 |

OTHER PUBLICATIONS

Machine Translation of KR100476252 (Year: 2005).*
Machine Translation of KR101427945 (Year: 2014).*
Machine Translation of EP0547945 (Year: 1993).*

* cited by examiner

STABILIZER BAR FOR A LOAD SPAN TAG AXLE

CROSS-REFERENCE TO RELATED PATENT APPLICATIONS

This application claims the benefit of U.S. Provisional Patent Application No. 62/987,017 filed on Mar. 9, 2020, the entire contents of which are incorporated herein by reference.

BACKGROUND

Work vehicles are known to carry heavy loads, and often to carry these loads over unpaved surfaces such as dirt roads and around construction sites. In particular, concrete trucks carry large drums full of concrete long distances and often must traverse unpaved surfaces to access the site for unloading the concrete from the drum. Concrete trucks typically include a cab for the operator and a rotatable drum behind the cab for containing and mixing concrete. Such concrete trucks further typically include a set of front wheels for steering, and plural rear drive axles carrying dual wheel or wide single line arrangements mounted on a continuous elongated chassis for load-support. For additional load-support, particularly in-transit when the drum is substantially full, a concrete truck can benefit by having a pivotally mounted tag axle (auxiliary axle) system able to operate between a raised position, in which it is carried by the truck, and a lowered/deployed position in which the tag axle and its wheels share the truck's load. Not only does the tag axle system assist in balancing the load carried by the concrete truck when the drum is fully loaded, it may facilitate the concrete truck carrying a higher total payload than would otherwise be permitted, because weight restrictions placed on vehicles traveling over highways are typically measured in terms of load per axle in combination with overall spacing between axles of a vehicle. By deploying a tag axle system, the number of axles as well as the spacing thereof can be increased when the truck is heavily loaded, thereby enabling the truck to transport a higher total legal payload.

Concrete mixer vehicles are configured to receive, mix, and transport wet concrete or a combination of ingredients that when mixed form wet concrete, to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward the concrete mixer vehicle. Because front discharge concrete mixer vehicles discharge concrete at the fore end, they can be used to supply concrete to locations having limited access. Concrete mixer vehicles are typically driven by an onboard internal combustion engine.

SUMMARY

One exemplary embodiment relates to a tag axle system for a concrete mixing vehicle including an axle including a right wheel assembly and a left wheel assembly, an actuator coupled to the axle to move the axle between a raised position and a lowered position relative to a vehicle chassis, a stabilizer mount plate structured to be coupled to the vehicle chassis, a stabilizer bar rotationally coupled to the stabilizer mount plate, a right stabilizer bar arm rigidly coupled to the stabilizer bar and coupled to the right wheel assembly, and a left stabilizer bar arm rigidly coupled to the stabilizer bar and coupled to the left wheel assembly.

Another exemplary embodiment relates to an auxiliary suspension for a heavy vehicle that includes an axle including a right axle stabilizer mount and a left axle stabilizer mount, an actuator coupled to the axle to move the axle between a raised position and a lowered position relative to a vehicle chassis, the actuator structured to act as a suspension, a stabilizer bar rotationally coupled to the vehicle chassis, a right stabilizer bar arm rigidly coupled between the stabilizer bar and the right axle stabilizer mount, and a left stabilizer bar arm rigidly coupled between the stabilizer bar and the left axle stabilizer mount.

Another exemplary embodiment relates to a stabilizer bar system for a load span tag axle that includes an axle beam, a four-bar linkage coupling the axle beam to a vehicle chassis, an actuator coupled between the axle beam and the vehicle chassis and structured to actuate the axle beam between a raised position and a lowered position, and to act as a suspension, and a stabilizer bar coupled between the vehicle chassis and the axle beam and structured to increase roll stiffness of the four bar linkage and actuator when used as a suspension.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
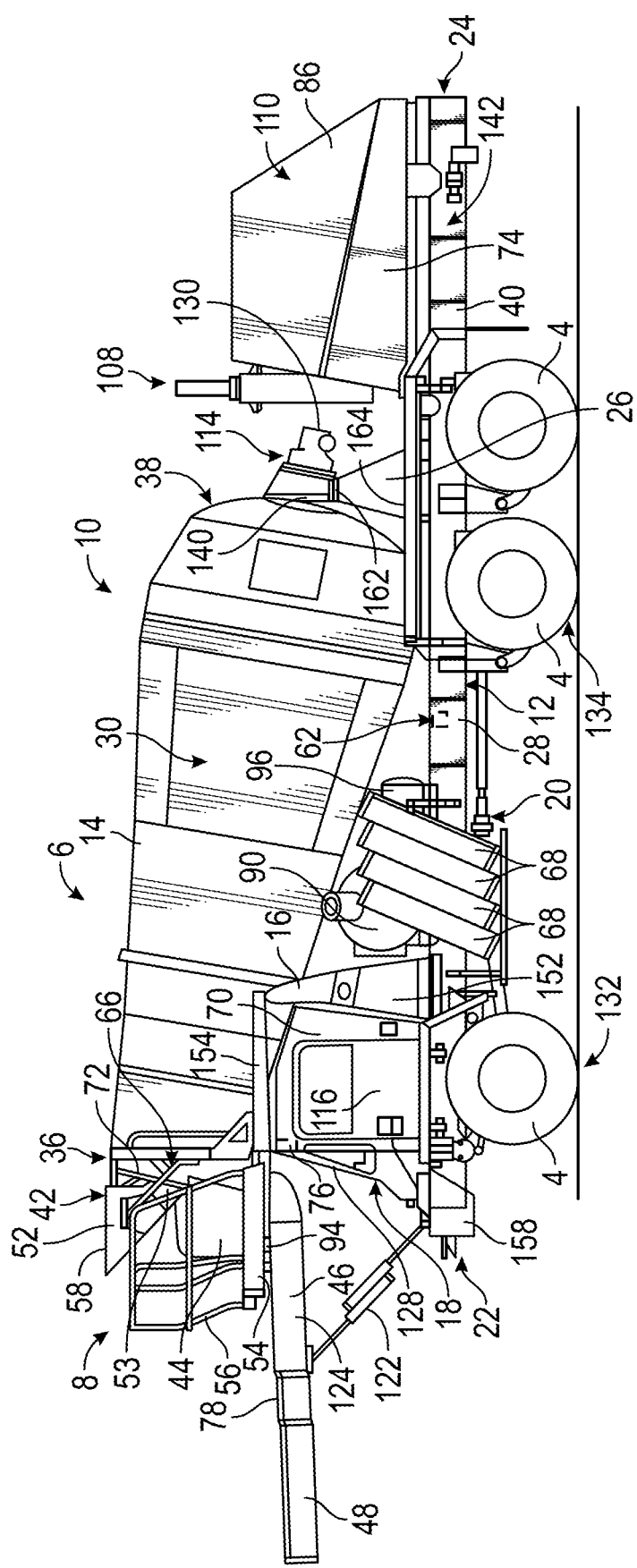
FIG. 1 is a side view of a concrete mixer truck, according to an exemplary embodiment.
Figure 2:
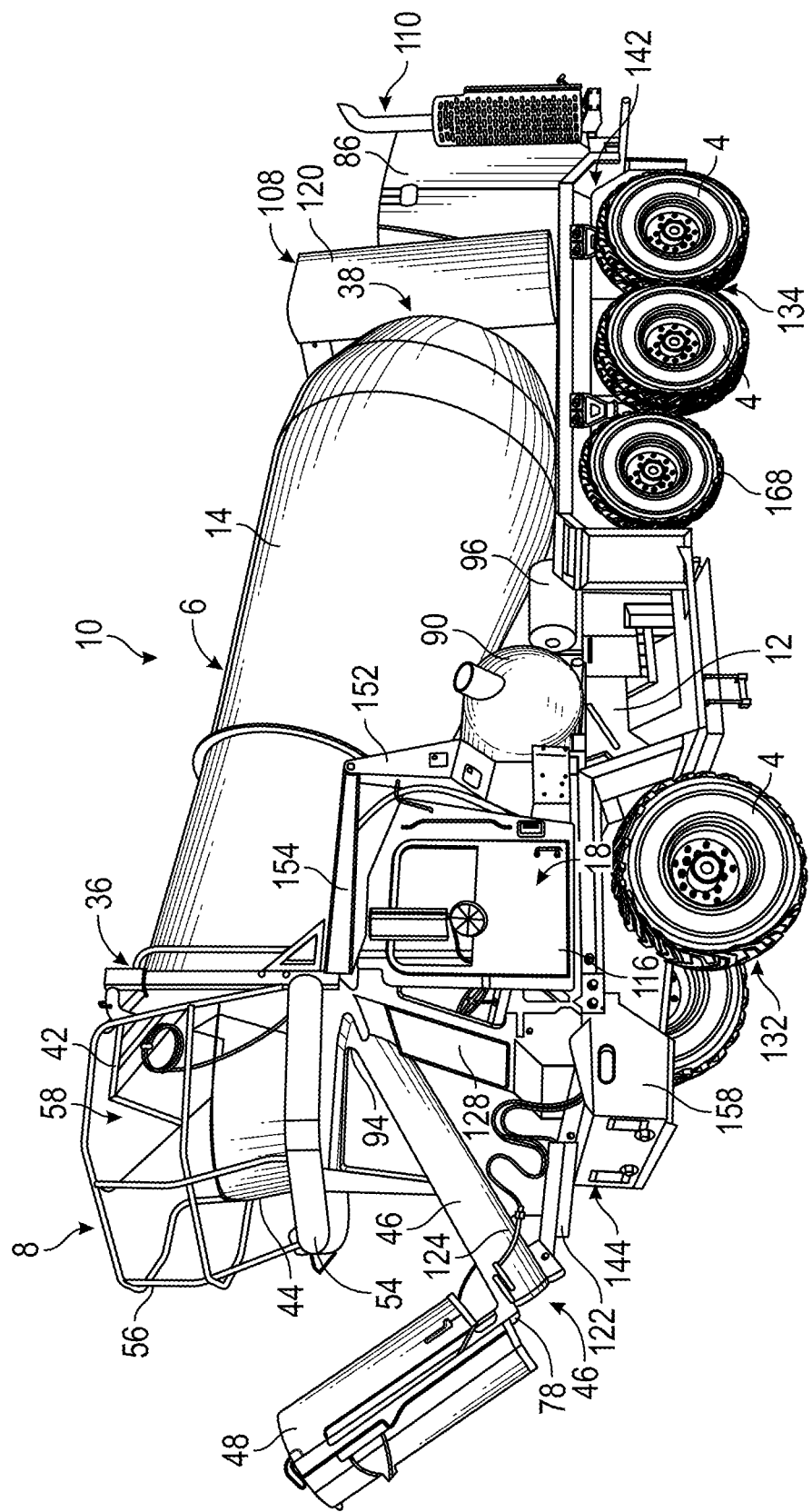
FIG. 2 is a front perspective view of the concrete mixer truck of FIG. 1, according to an exemplary embodiment.
Figure 3:
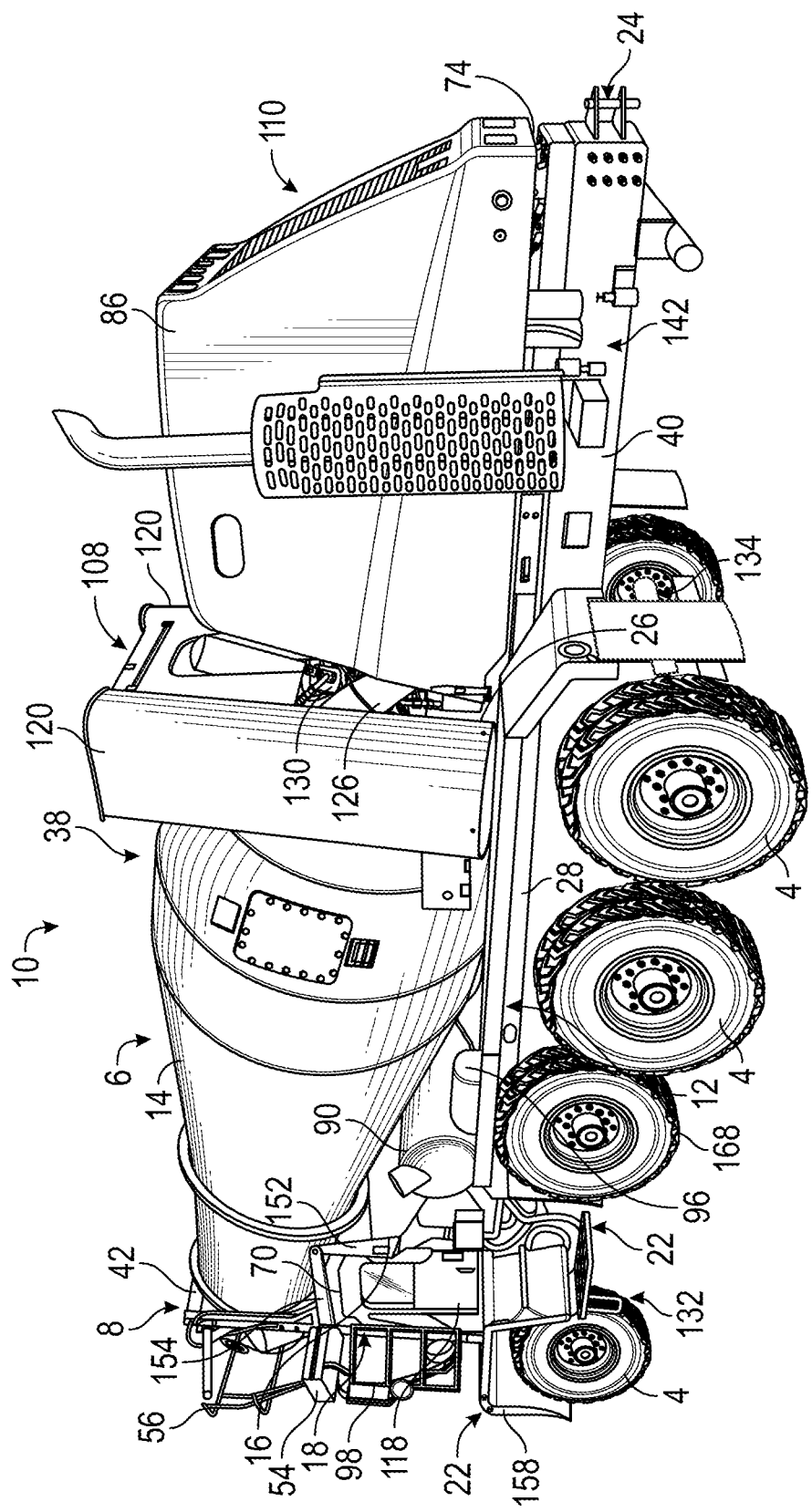
FIG. 3 is a rear perspective view of the concrete mixer truck of FIG. 1, according to an exemplary embodiment.

According to an exemplary embodiment, a tag axle system in the form of a load span tag axle system is actuatable between a raised position and a lowered position where the tag axle system supports a portion of a vehicle load. The tag axle system includes an anti-sway bar (e.g., sway bar, anti-roll bar, roll-bar) system in the form of a stabilizer bar system including a stabilizer bar, stabilizer bar arms, and stabilizer bar links coupling the stabilizer bar arms to a tag axle. The stabilizer bar transfers rotational movement from a right side of the tag axle to a left side of the tag axle and thereby increases a roll resistance of the tax axle system.
Overall Vehicle According to the exemplary embodiment shown in FIGS. 1-3, a vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1-3, the concrete mixer truck 10 is a front discharge concrete mixer vehicle. In other embodiments, the concrete mixer truck 10 is a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a ground surface or road. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12. The frame 28 may include lift eyes or other structures that facilitates lifting along the chassis 12 such that the chassis 12 can be manipulated as a subassembly for assembly and/or maintenance of the concrete mixer truck 10. One or more components may be coupled to the chassis 12 using isolating mounts made of a compliant material, such as rubber. The isolating mounts may be configured to reduce the transfer of vibrations between the components and the chassis 12.

The frame 28 includes a pair of frame rails 40 coupled with intermediate cross members, according to an exemplary embodiment. The frame rails 40 extend in a generally-horizontal and longitudinal direction (e.g., extend within ten degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 40 may be disposed along a first lateral side 142 and a second frame rail 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In one embodiment, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be used to supply water to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of the concrete mixer truck 10 and may be angled relative to the frame rails 40 (e.g., when viewed from the side of the concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40. Although the concrete mixer truck 10 illustrated in FIGS. 1-3 is a front discharge concrete mixer vehicle, it is to be understood that in other embodiments the concrete mixer truck 10 may include a drum assembly 6 having any other discharge arrangement (e.g., rear discharge).

The front pedestal 16 includes an upper portion 152 and a lower portion 154. The upper portion 152 is coupled to and supports the hopper assembly 8. The lower portion 154 is coupled to the frame rails 40 and supports the upper portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of the mixing drum 14 and the drum drive motor 130 extends rearward from the drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which are positioned above at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuator (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44, such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124. In some embodiments, a plurality of extension chutes 48 are pivotally connected to one another. One or more removable/detachable extension chutes 68 may be selectively coupled to the distal end of the extension chute 48. The main chute 46 is selectively reconfigurable between a first configuration (e.g., a storage configuration, a transport configuration, etc.) and a second configuration (e.g., a use configuration, a dispensing configuration, etc.). In the first configuration, (i) the base section 124 may be selectively oriented substantially horizontal and extending laterally outward, (ii) the extension chute 48 may be selectively pivoted relative to the base section 124 and extending substantially vertically, and (iii) the removable extension chutes 68 may be removed from the extension chute 48 and stored elsewhere in the concrete mixer truck 10 (e.g., coupled to the chassis 12 beneath the mixing drum 14, etc.). In the first configuration, the main chute 46 may, therefore, minimally obscures the view of an operator positioned within the cab 18. In the second configuration, (i) the extension chute 48 may be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 may be coupled to the distal end of the extension chute 48 to increase the length of the main chute 46 (e.g., to distribute concrete further away from the concrete mixer truck 10, etc.).

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuators 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48. The first chute actuator 78, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, auxiliary system, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to rotate wheel and tire assemblies, to drive the transmission, etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank.

Load Span Tag Axle System

Figure 4:
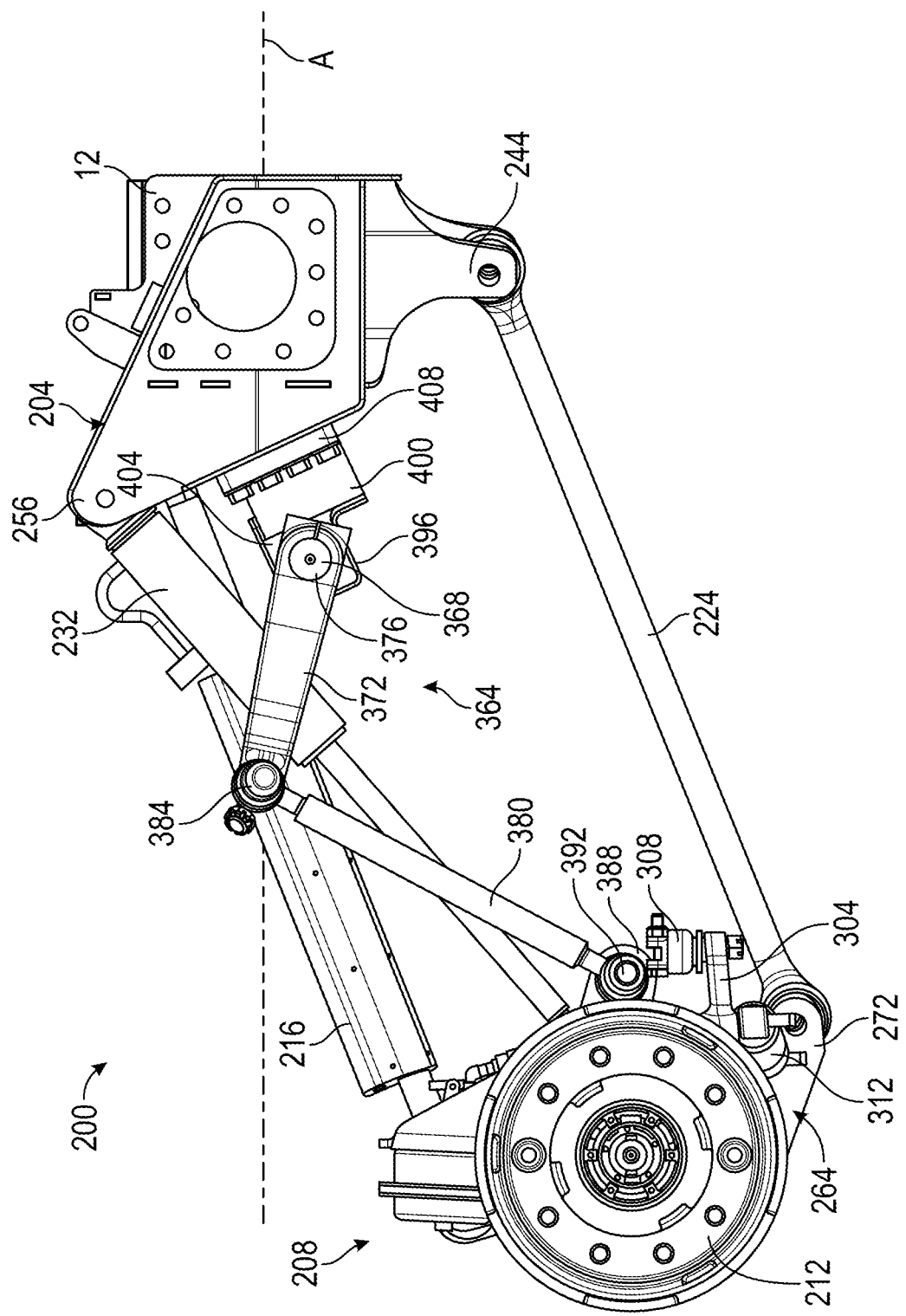
FIG. 4 is a right side view of a load span tag axle system of the concrete mixer truck of FIG. 1, according to an exemplary embodiment.

As shown in FIG. 4, a load span tag axle (LSTA) system 200 can be used in addition to or replace the pusher axle assembly 168 (e.g., a tag axle, an auxiliary axle, etc.) discussed above. The LSTA system 200 is coupled to the vehicle chassis 12 and includes a chassis mount 204 that is rigidly attached to the vehicle chassis 12, and an axle assembly 208 that supports two hubs 212 (each hub 212 configured to support a wheel) and is connected to the chassis mount 204 by a four-bar swing linkage that includes a right upper link 216, a left upper link 220 (see FIG. 13), a right lower link 224, and a left lower link 228 (See FIG. 14). A right hydraulic cylinder 232 and a left hydraulic cylinder 236 are connected between the chassis mount 204 and the axle assembly 208 and, in one mode of operation, actuate the axle assembly 208 between a raised position and a lowered position. A hydraulic system 238 controls operation of the right hydraulic cylinder 232 and the left hydraulic cylinder 236. In other embodiments, the LSTA system 200 includes another type of actuator in addition to or in place of the right hydraulic cylinder 232 and the left hydraulic cylinder 236 (e.g., a rotary hydraulic actuator, another type of rotary actuator, another type of linear actuator, etc.).

The chassis mount 204 is attached to the vehicle chassis 12 (e.g., with fasteners, etc.). In some embodiments, the chassis mount 204 is welded to the vehicle chassis 12 or formed as a part of the vehicle chassis 12. The chassis mount 204 includes a right upper mount bracket 240, a right lower mount bracket 244, a left upper mount bracket 248, and a left lower mount bracket 252. The right upper mount bracket 240 is structured to be connected to the right upper link 216, the right lower mount bracket 244 is structured to be connected to the right lower link 224, the left upper mount bracket 248 is structured to be connected to the left upper link 220, and the left lower mount bracket 252 is structured to be connected to the left lower link 228. In some embodiments, the links 216, 220, 224, 228 are connected to the mount brackets 240, 244, 248, 252 with captured bearings and fastener arrangements. In some embodiments, the links 216, 220, 224, 228 are permitted to move relative to the mount brackets 240, 244, 248, 252 with one degree of freedom (e.g., rotation) and are substantially constrained from moving in a side to side direction.

The chassis mount 204 further includes a right actuator mount bracket 256 that is structured to be connected to the right hydraulic cylinder 232 and a left actuator mount bracket 260 that is structured to be connected to the left hydraulic cylinder 236. Similar to the mount brackets 240, 244, 248, 252, the actuator mount brackets 256, 260 can be connected to the hydraulic cylinders 232, 236 with captured bearings and fasteners to permit rotation of the hydraulic cylinders 232, 236 relative to the chassis mount 204 while inhibiting other movement of the hydraulic cylinders 232, 236.

The axle assembly 208 includes an axle beam 264 that includes a right upper axle bracket 268 structured to be connected to the right upper link 216, a right lower axle bracket 272 structured to be connected to the right lower link 224, a left upper axle bracket 276 structured to be connected to the left upper link 220, and a left lower axle bracket 280 structured to be connected to the left lower link 228. Similar to the mount brackets 240, 244, 248, 252, the axle brackets 268, 272, 276, 280 can be connected to the links 216, 220, 224, 228 with captured bearings and fasteners to permit rotation of the links 216, 220, 224, 228 relative to the axle beam 264 while inhibiting other movement of the links 216, 220, 224, 228. The axle beam 264 also includes a right actuator axle bracket 284 that is structured to be connected to the right hydraulic cylinder 232, and a left actuator axle bracket 288 that is structured to be connected to the left hydraulic cylinder 236. The actuator axle brackets 284, 288 can be connected to the hydraulic cylinders 232, 236 with captured bearings and fasteners to permit rotation of the hydraulic cylinders 232, 236 relative to the axle beam 264 while inhibiting other movement of the hydraulic cylinders 232, 236. In some embodiments, each of the links 216, 220, 224, 228 is secured to the axle beam 264 using a bolt (not shown) that extends through holes in the axle brackets 268, 272, 276, 280 and a bushing at one end of the links 216, 220, 224, 228.

The axle assembly 208 also includes a right wheel assembly 292 and a left wheel assembly 296. The left wheel assembly 296 is substantially similar to the right wheel assembly 292, with like numerals identifying like components (i.e. components for the left wheel assembly 296 that are similar to the right wheel assembly 292 are denoted using like numbers in prime series). The right wheel assembly 292 is mounted to the axle beam 264 and includes a spindle/knuckle, a brake assembly, a kingpin 300 coupled between the spindle/knuckle and the axle beam 264 at a kingpin caster angle to allow rotation of the wheel assembly 292 relative to the axle beam 264 thereabout, and a steering arm 304 extending from the spindle/knuckle toward the vehicle chassis 12. A hub is attached to the spindle/knuckle and is free to rotate thereabout. The brake assembly is structured to slow the rotation of the hub via frictional engagement. In some embodiments, the brake assembly is a drum brake assembly, a disk brake assembly, a manually operated brake system, and electronically operated brake system, a hydraulic brake system, or another brake system, as desired.

The axle assembly 208 further includes a steering assembly having a connecting rod 308 connected between the steering arms 304, 304', and a centering system having a right spring damper 312 connected between the axle beam 264 and the right steering arm 304 and a left spring damper 312' connected between the axle beam 264 and the left steering arm 304'. The connecting rod 308 ties the right wheel assembly 292 to the left wheel assembly 296 so that rotation (e.g., steering) of the wheel assemblies 292, 296 is coordinated. In other words, the right wheel assembly 292 is inhibited from rotating relative to the left wheel assembly 296. The right spring damper 312 and the left spring damper 312' act to bias the wheel assemblies 292, 296 toward a center position (e.g., a position that drives straight). The connecting rod 308 is arranged vertically between the upper links 216, 220 and the lower links 224, 228 and in front of the axle beam 264. Additionally, the caster angle of the wheel assemblies 292, 296 can be changed to move the steering axis in forward or backward, as desired.

Figure 14:
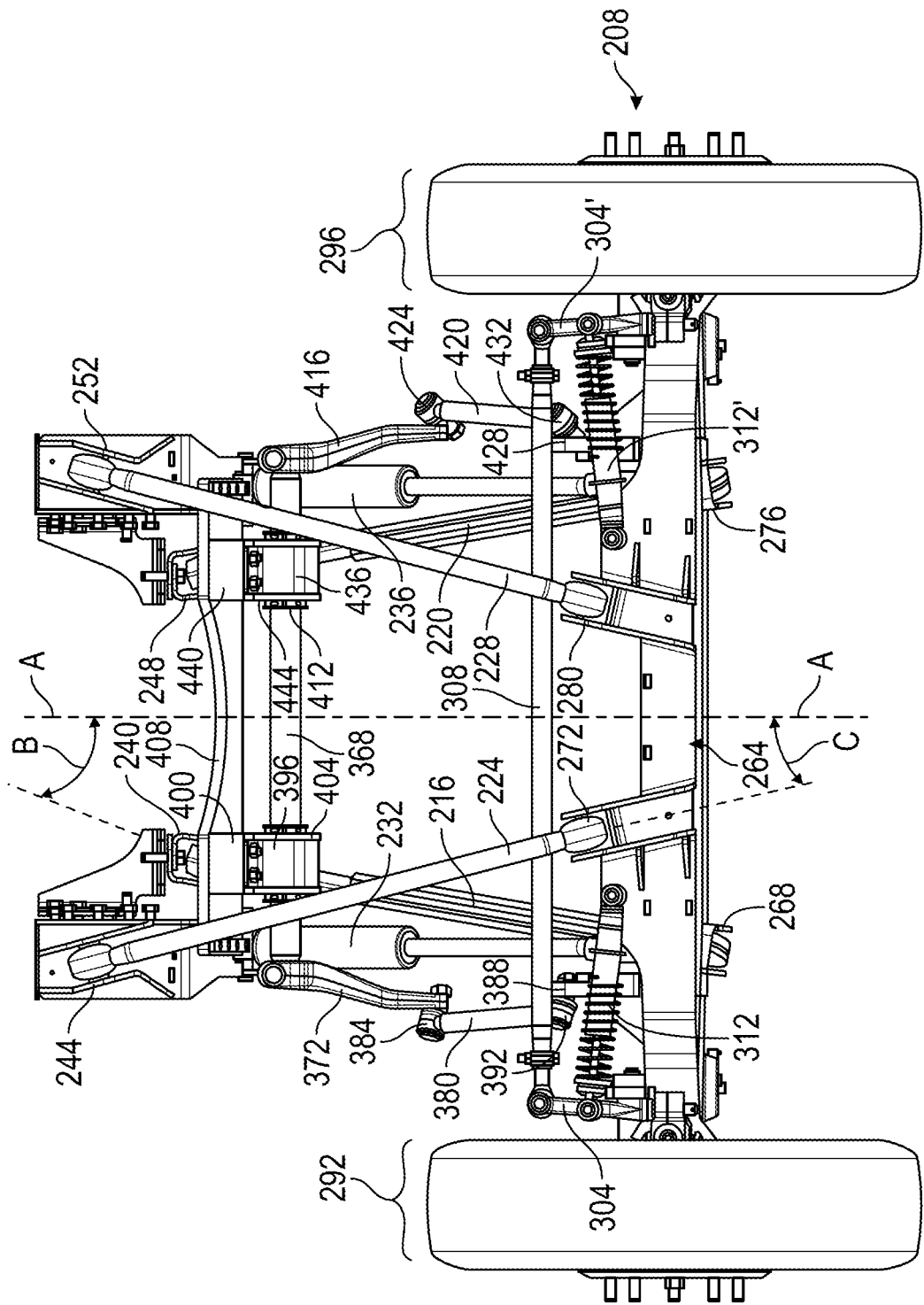
FIG. 14 is a bottom view of the load span tag axle system of FIG. 4, according to an exemplary embodiment.

The four-bar swing linkage that couples the chassis mount 204 to the axle assembly 208 includes the right upper link 216, the left upper link 220, the right lower link 224, and the left lower link 228. The vehicle chassis 12 defines a central axis A extending longitudinally (e.g., front to back). The upper links 216, 220 are angled laterally outward (e.g., away from the central axis A) as they extend toward the axle beam 264. As shown in FIG. 14, each of the upper links 216, 220 define an upper link angle B relative to the central axis A. The upper link angle of the right upper link 216 is mirrored relative to the upper link angle of the left upper link 220. In some embodiments, the upper link angle B is about nine degrees (9°). In some embodiments, the upper link angle B is between about five degrees (5°) and about fifteen degrees (15°). The lower links 224, 228 are angled laterally inward (e.g., toward the central axis A) as they extend toward the axle beam 264. As shown in FIG. 14, each of the lower links 224, 228 define a lower link angle C relative to the central axis A. The lower link angle of the right lower link 224 is mirrored relative to the lower link angle of the left lower link 228. In some embodiments, the lower link angle C is about nine degrees (9°). In some embodiments, the lower link angle C is between about five degrees (5°) and about fifteen degrees (15°). In some embodiments, the upper link angle B and the lower link angle C are different. Additionally, the upper link angle B and the lower link angle C are mirrored relative to each other so that there is one-hundred-sixty-two degrees (162°) between the upper link angle B and the lower link angle C). The upper link angle B and the lower link angle C provide support in case of side loading from wheel scrubbing or other forces acting in a side-to-side direction. In another embodiment, the four-bar swing linkage has links that are otherwise positioned. By way of example, the upper links 216, 220 may angle laterally inward and the lower links 224, 228 may angle laterally outward.

The four-bar swing linkage including the right upper link 216, the left upper link 220, the right lower link 224, and the left lower link 228 is arranged as a parallelogram linkage (i.e., a parallelogram arrangement) and is arranged to maintain the kingpin caster angle regardless of loading in the lowered position. The kingpin caster angle affects wheel chatter and wear characteristics. Controlling the kingpin caster angle throughout use in the lowered position provides an improvement over prior tag axles where the kingpin caster angle can change or become too low in some loading conditions. Some prior tag axles used shims in an attempt to control the kingpin caster angle, but were unable to address all loading conditions. The parallelogram linkage substantially eliminates the use of shims and addresses more loading conditions.

In some embodiments, the four-bar linkage is not arranged as a parallelogram linkage arrangement. A non-parallelogram arrangement may result in small changes to the kingpin caster angle, but the variance of the kingpin caster angle may be maintained within an acceptable range when in the lowered position. While the kingpin caster angle may be variable, the non-parallelogram linkage may provide additional space between the links as they actuate between the raised position and the lowered position. Additionally, the non-parallelogram linkage may provide a greater axle lift height. The additional space is created by the axle rotating forward (more upright) as it lifts which increases the vertical spacing between the attachment points on the axle.

In some embodiments, the right hydraulic cylinder 232 and the left hydraulic cylinder 236 each include a cylinder structured to couple with a respective actuator mount bracket 256, 260, a plunger dividing the cylinder into a first chamber and a second chamber that is isolated from the first chamber, and a rod extending from the plunger and structured to couple with the respective actuator axle bracket 284, 288. The right hydraulic cylinder 232 and the left hydraulic cylinder 236 are dual action hydraulic cylinders that can be actively driven between a retracted position corresponding to the raised position of the LSTA system 200 and an extended position corresponding to the lowered position of the LSTA system 200.

Figure 15:
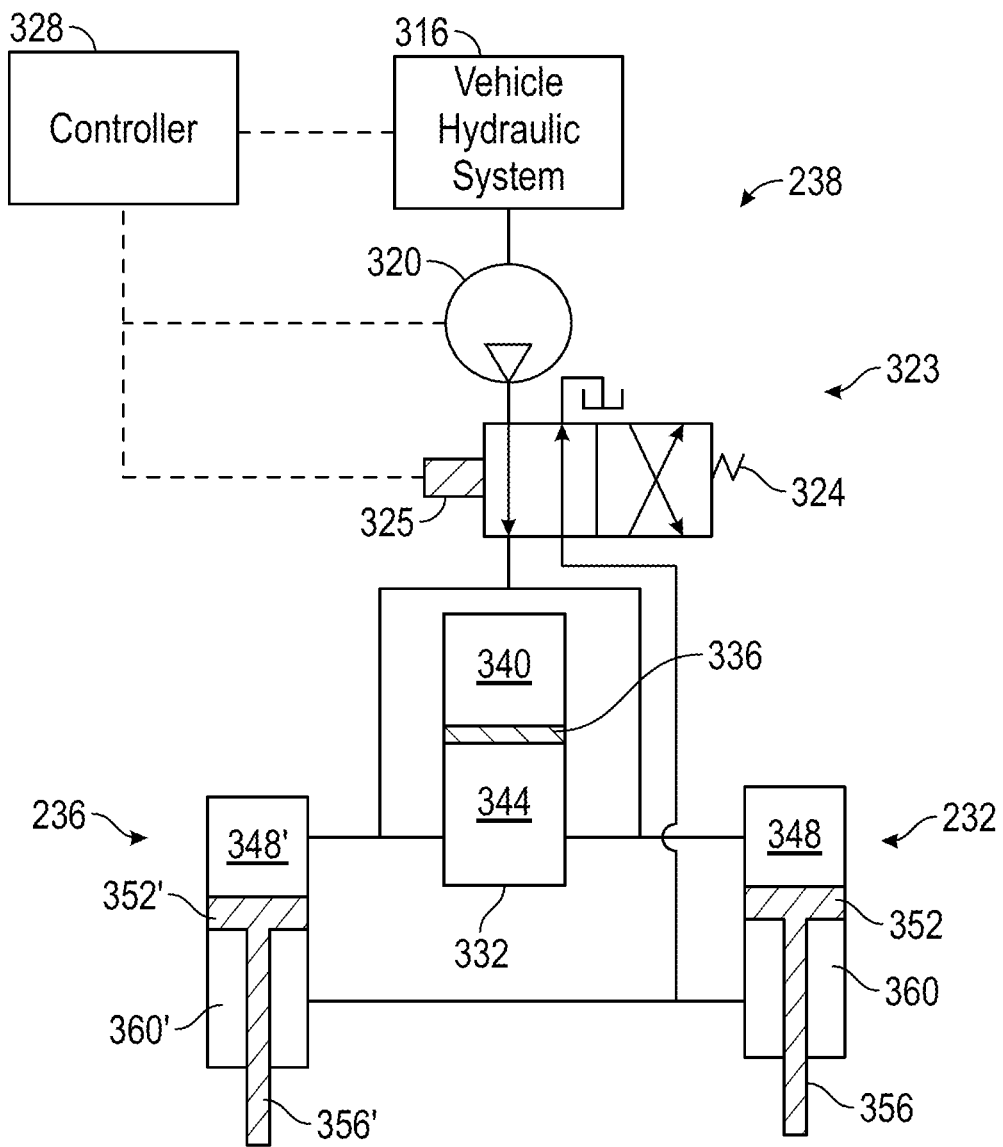
FIG. 15 is a schematic view of a hydraulic system of the load span tag axle system of FIG. 4, according to an exemplary embodiment.

As shown in FIG. 15, the hydraulic system 238 of the LSTA system 200 includes a vehicle hydraulic system 316 that controls various systems and subsystem of the concrete mixer truck 10. In some embodiments, the vehicle hydraulic system 316 operates the concrete mixer, a vehicle suspension system, a vehicle transmission, and/or other vehicle systems. A pump 320 is arranged in communication with the vehicle hydraulic system 316 and operable to provide high pressure hydraulic fluid to a control valve 323. In some constructions, the control valve 323 is a two-position four-way spool valve that includes a return spring 324 and a solenoid 325. In some constructions, the control valve 323 may include a double acting inching circuit, or another control architecture, as desired. A controller 328 is arranged in communication with the vehicle hydraulic system 316, the pump 320, and the control valve 323 to control operation of the LSTA system 200 between the raised position (e.g., a lift mode) and the lowered position (e.g., a suspension/operational mode).

In some embodiments, the hydraulic system 238 also includes an accumulator 332 that includes a movable element 336 (e.g., a piston). The movable element 336 separates a spring chamber 340 from a collecting chamber 344 that is in fluid communication with a first chamber 348 of the right hydraulic cylinder 232 and a first chamber 348' of the left hydraulic cylinder 236. In some embodiments, the spring chamber 340 is charged with nitrogen or another gas to a predetermined pressure calibrated to a desired spring rate. In some embodiments, the spring chamber 340 is in communication with a pressure source (e.g., a pneumatic compressor) and maintained at the predetermined pressure. The movable element 336 moves within the accumulator 332 to compress the gas in the spring chamber 340 thereby prompting a spring force in opposition to the movement. In other words, the predetermined pressure in the spring chamber 340 exerts a bias or a spring force against the movable element 336 toward the collecting chamber 344.

With continued reference to FIG. 15, when the controller 328 controls actuation to the lowered position, the control valve 323 is moved to a first position and the pump 320 provides high pressure hydraulic fluid to the first chambers 348, 348' of the hydraulic cylinders 232, 236 and the collecting chamber 344 of the accumulator 332. The high pressure hydraulic fluid exerts force on plungers 352, 352' and rods 356, 356' are moved to the extended position so that the LSTA system 200 is arranged in the lowered position (i.e., the suspension/operational mode). As the concrete mixer truck 10 moves over uneven terrain, forces and movement may be imparted to the LSTA system 200. The right hydraulic cylinder 232 and the left hydraulic cylinder 236 are structured as suspension elements. As a suspension force acts on the rods 356, 356' hydraulic fluid is pushed from the first chambers 348, 348' into the collection chamber 344 of the accumulator 332 against the spring force of the spring chamber 340. As the movable element 336 moves within the accumulator 332, the spring force increases and the movable element 336 is forced toward the collecting chamber 344 and the rods 356, 356' are again extended. In this way, a spring/damper (i.e., spring damper) suspension system is provided by the same cylinders (e.g., the right hydraulic cylinder 232 and the left hydraulic cylinder 236) that are used for actuation between modes. The accumulator 332 increases the reaction speed of the hydraulic system 238 when it is acting as a suspension system. The controller 328 controls the pump 320 to maintain a constant pressure within the cylinders 232, 236, so that a desired ground force is maintained.

When the controller 328 controls actuation to the raised position, the control valve 323 is moved to a second position so that high pressure hydraulic fluid is provided from the pump 320 to second chambers 360, 360' of the hydraulic cylinders 232, 236 thereby retracting the rods 356, 356'. In some embodiments, the return spring 324 biases the control valve 323 to the second position, so that the second position is the rest position. In some embodiments, the return spring 324 is arranged to bias the control valve 323 toward the first position. In some embodiments, the control of the control valve 323 is arranged differently. For example, the control valve 323 may utilize pilots, more solenoids, manual controls, or other control architectures.

In some embodiments, when in the raised position, the spindles/knuckles are raised above the vehicle chassis 12, and when in the lowered position the spindles/knuckles are lowered below the vehicle chassis 12.

As shown in FIG. 4, a stabilizer bar system 364 includes a stabilizer bar 368 extending transversely to the central axis A, a right stabilizer bar arm 372 coupled to the stabilizer bar 368 with a bar/arm connection in the form of a spline 376 that inhibits relative rotation between the stabilizer bar 368 and the right stabilizer bar arm 372. In some embodiments, the bar/arm connection includes a keyway and key, a D-shape, or any other coupling profile structured to inhibit rotation of the stabilizer bar arm 368 relative to the right stabilizer bar arm 372. In some embodiments, the geometry of the right stabilizer bar arm 372 provides a clamp structure that captures the bar/arm connection.

A right stabilizer bar link 380 is coupled to the right stabilizer bar arm 372 by an upper joint 384 (e.g., a tapered ball joint) that allows rotation of the right stabilizer bar arm 372 relative to the right stabilizer bar link 380. The right stabilizer bar link 380 is coupled to a right axle stabilizer mount 388 of the axle beam 264 by a lower joint 392 (e.g., a tapered ball joint) that allows rotation of the right stabilizer bar link 380 relative to the axle beam 264.

Figure 6:
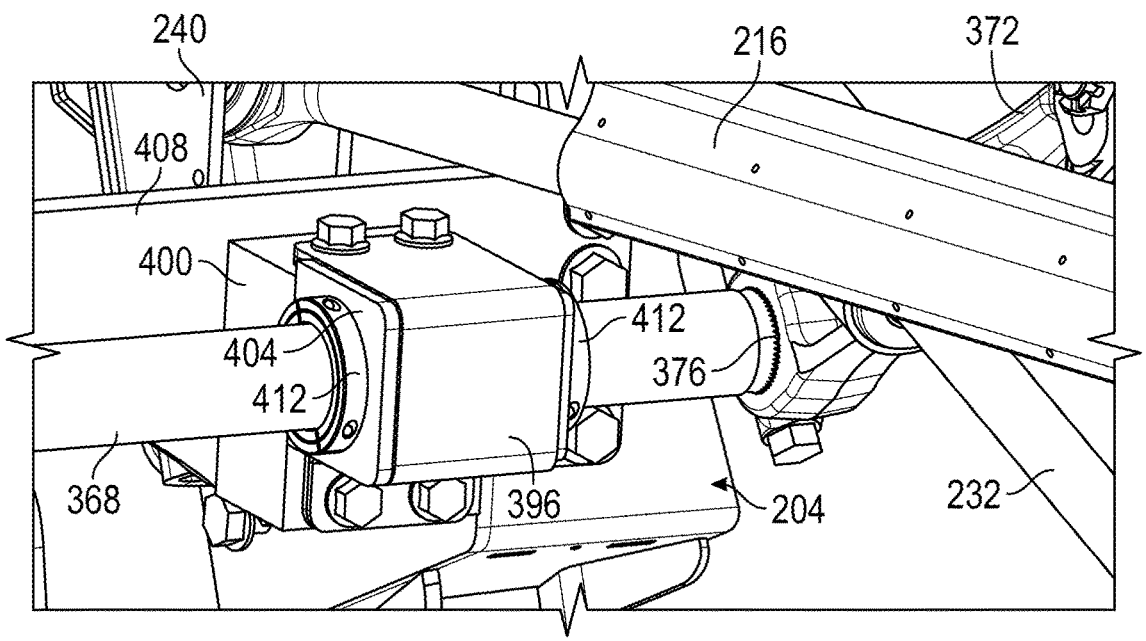
FIG. 6 is a detailed view of the load span tag axle system of FIG. 4, according to an exemplary embodiment.

The stabilizer bar 368 is coupled to the chassis mount 204 with a right bushing mount bracket 396, a right spacer block 400, a right bushing 404 captured between the right bushing mount bracket 396 and the right spacer block 400, and a stabilizer bar mount plate 408 that is coupled to the chassis mount 204. As shown in FIG. 6, clamp collars 412 are coupled to the stabilizer bar 368 to inhibit lateral movement of the stabilizer bar 368 within the right bushing 404.

In some embodiments, the right bushing mount bracket 396 is fastened to the right spacer block 400 to capture the right bushing 404 therebetween, and the right spacer block 400 is fastened to the stabilizer bar mount plate 408. In some embodiments, the right spacer block 400 is welded to the stabilizer bar mount plate 408 or is formed as a part of the stabilizer mount plate 408. In some embodiments, the right spacer block 400 is eliminated. The right spacer block 400 moves the stabilizer bar 368 relative to the chassis mount 204 and provides clearance of components of the LSTA system 200. The right bushing 404 adds torsional and radial stiffness to the stabilizer bar 368. The stabilizer bar mounting plate 408 provides a rigid mounting plate to increases the strength of the stabilizer bar system 364.

Figure 13:
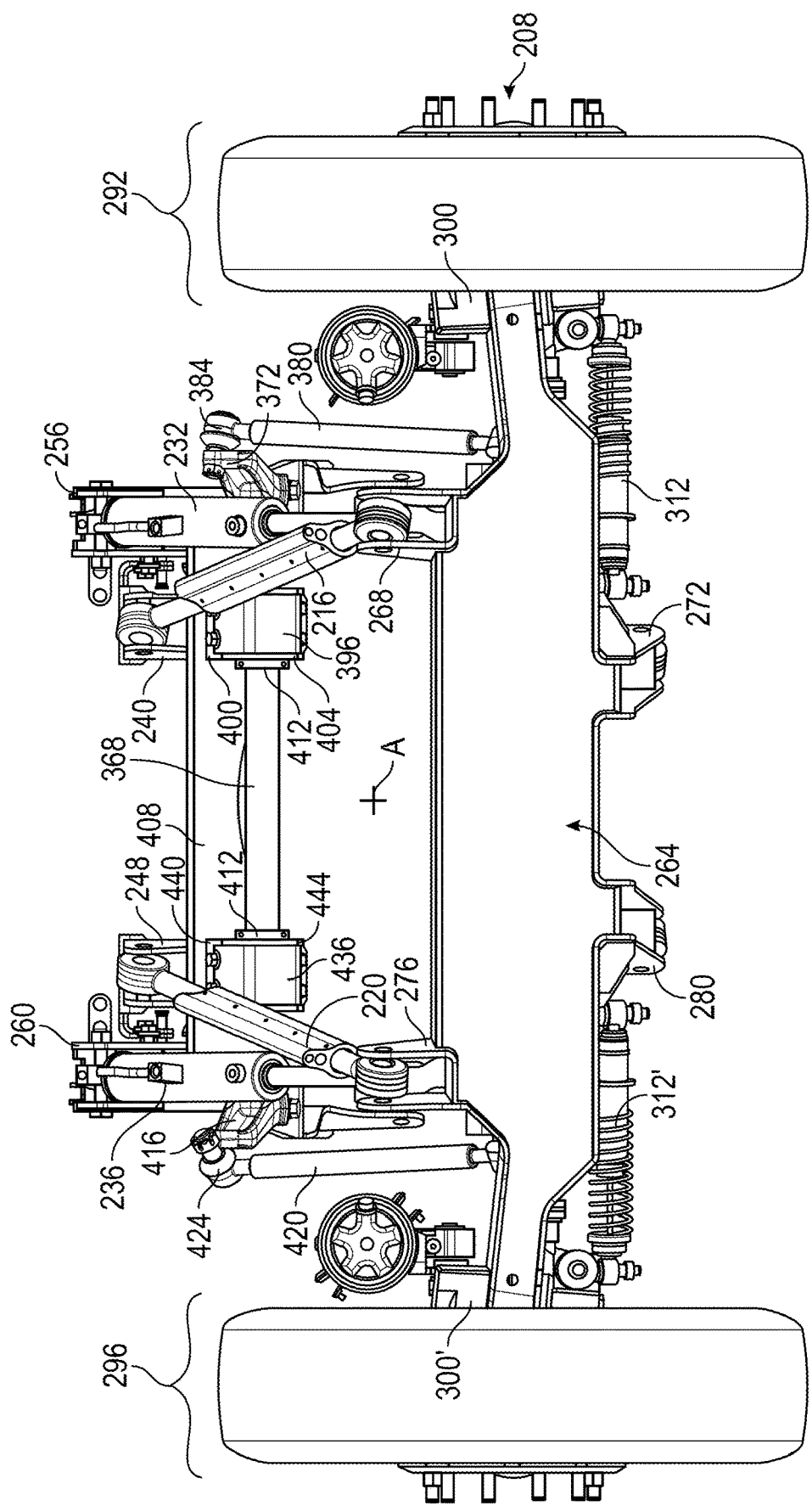
FIG. 13 is a rear view of the load span tag axle system of FIG. 4, according to an exemplary embodiment.

As shown in FIG. 13, the stabilizer bar system 364 includes a left side that is a mirror of the right side described above and includes a left stabilizer bar arm 416 coupled to the stabilizer bar 368 with a bar/arm connection in the form of a spline that inhibits relative rotation between the stabilizer bar 368 and the left stabilizer bar arm 416. In some embodiments, the geometry of the left stabilizer bar arm 416 provides a clamp structure that captures the bar/arm connection. A left stabilizer bar link 420 is coupled to the left stabilizer bar arm 416 by an upper joint 424 (e.g., a tapered ball joint) that allows rotation of the left stabilizer bar arm 416 relative to the left stabilizer bar link 420. The left stabilizer bar link 420 is coupled to a left axle stabilizer mount 428 of the axle beam 264 by a lower joint 432 (e.g., a tapered ball joint) that allows rotation of the left stabilizer bar link 420 relative to the axle beam 264. The stabilizer bar 368 is coupled to the chassis mount 204 with a left bushing mount bracket 436, a left spacer block 440, a left bushing 444 captured between the left bushing mount bracket 436 and the left spacer block 440. Clamp collars 412 are coupled to the stabilizer bar 368 to inhibit lateral movement of the stabilizer bar 368 within the left bushing 444.

Figure 5:
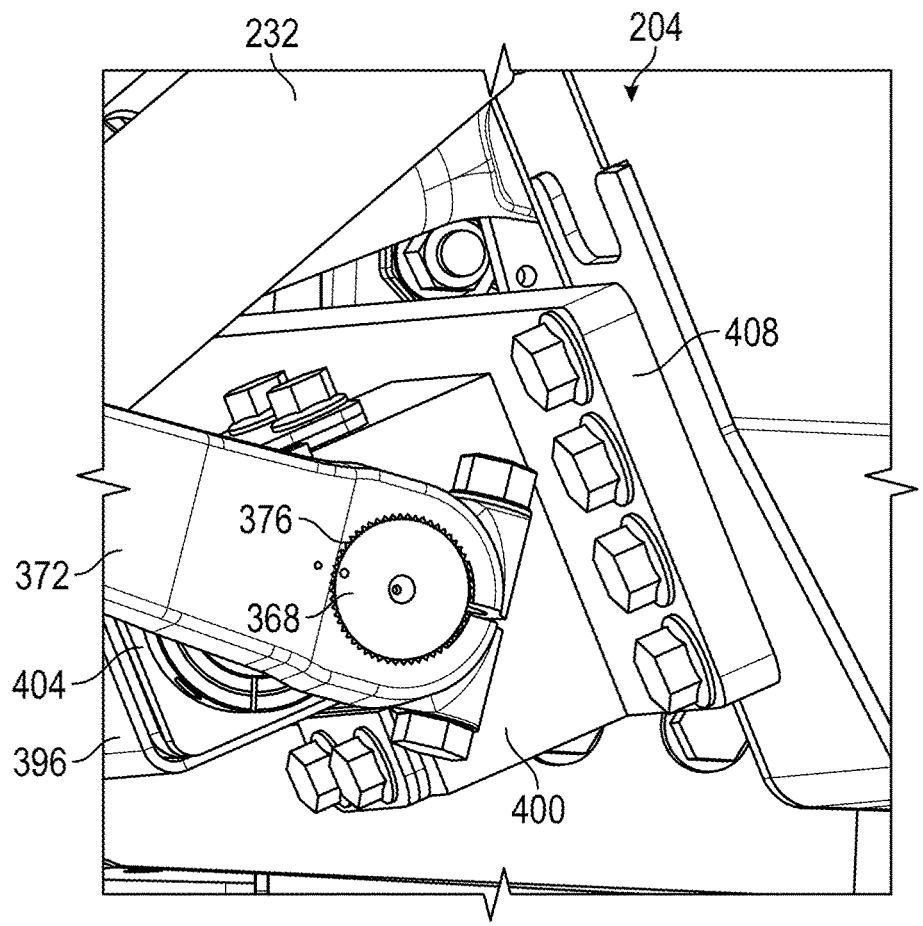
FIG. 5 is a detailed view of the load span tag axle system of FIG. 4, according to an exemplary embodiment.
Figure 7:
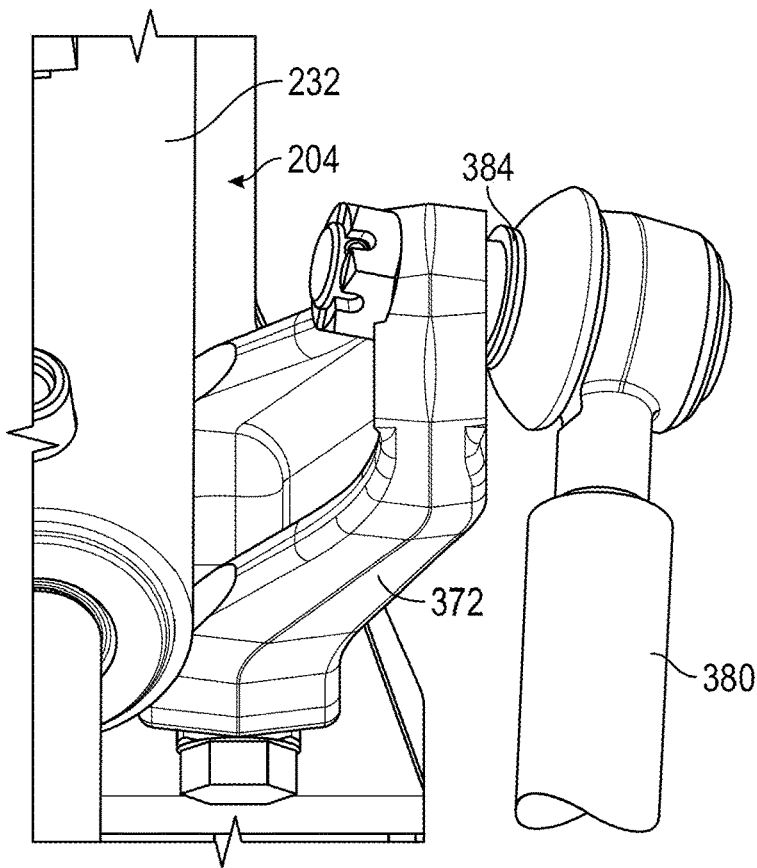
FIG. 7 is a detailed view of the load span tag axle system of FIG. 4, according to an exemplary embodiment.
Figure 8:
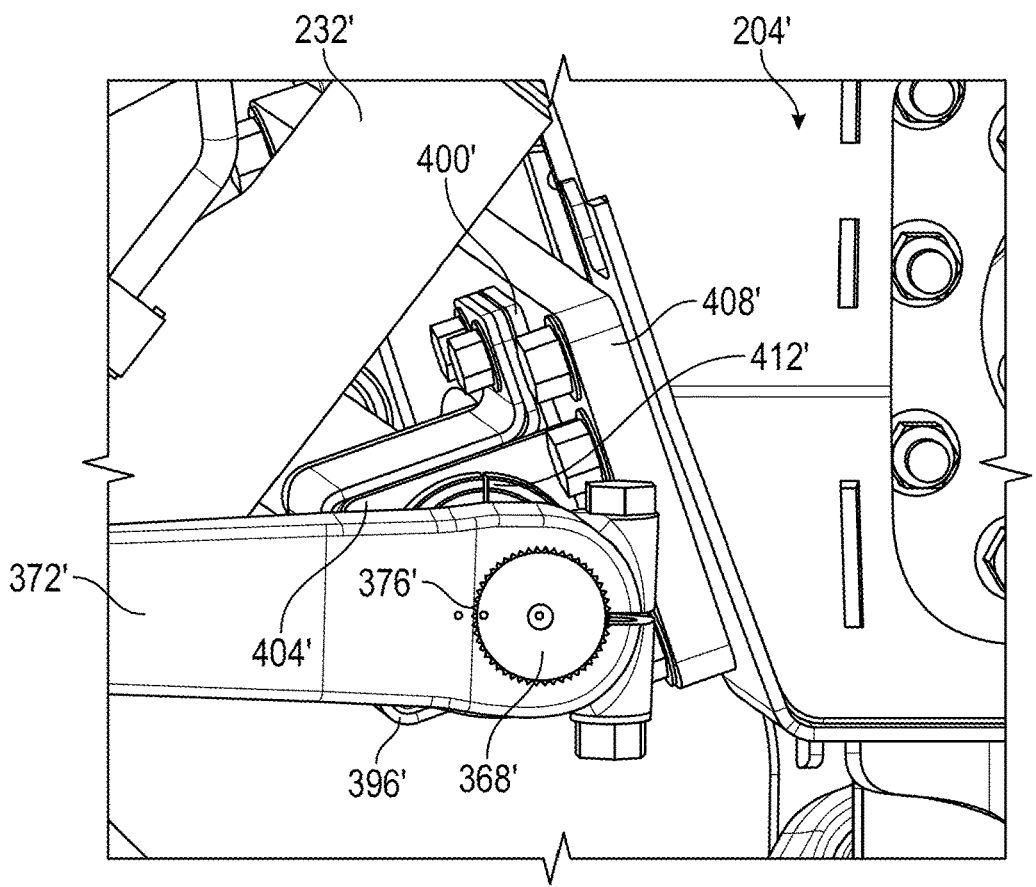
FIG. 8 is a detailed view of another load span tag axle system of the concrete mixer truck of FIG. 1, according to an exemplary embodiment.
Figure 9:
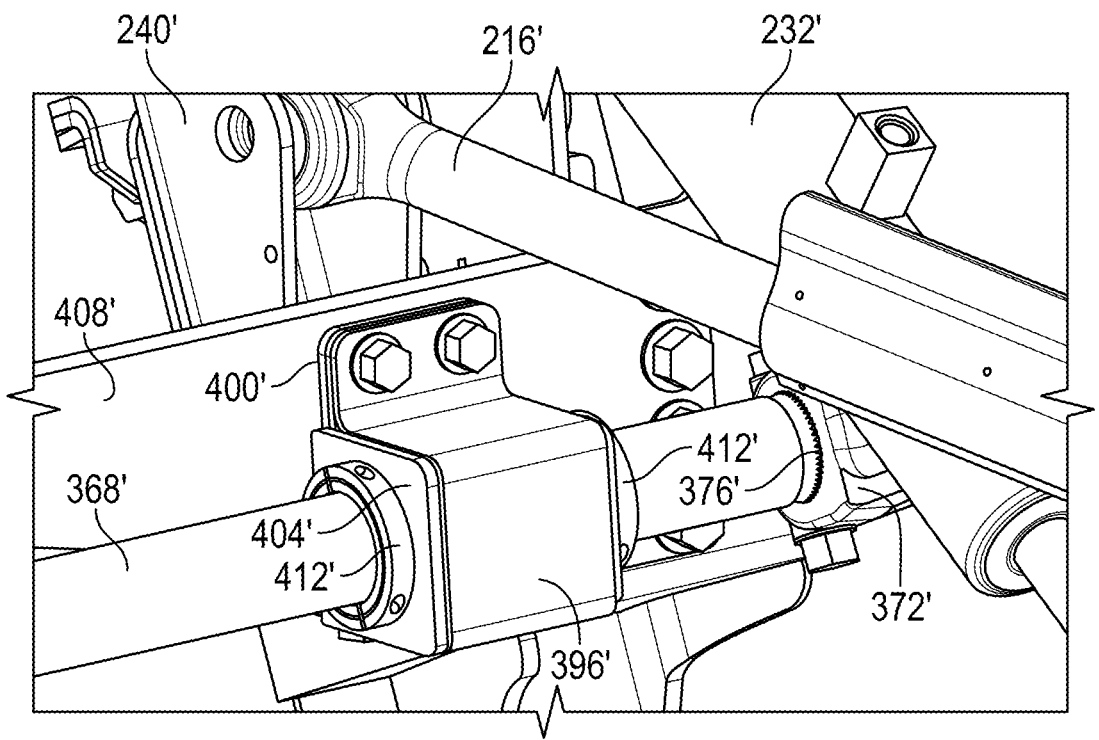
FIG. 9 is a detailed view of the load span tag axle system of FIG. 8, according to an exemplary embodiment.
Figure 10:
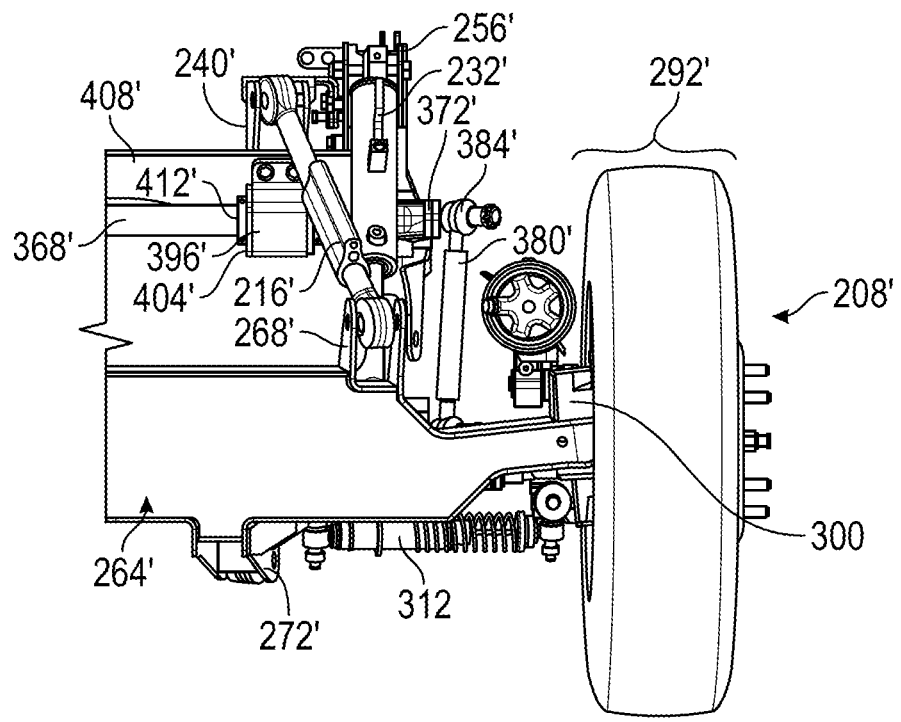
FIG. 10 is a detailed view of the load span tag axle system of FIG. 8, according to an exemplary embodiment.
Figure 11:
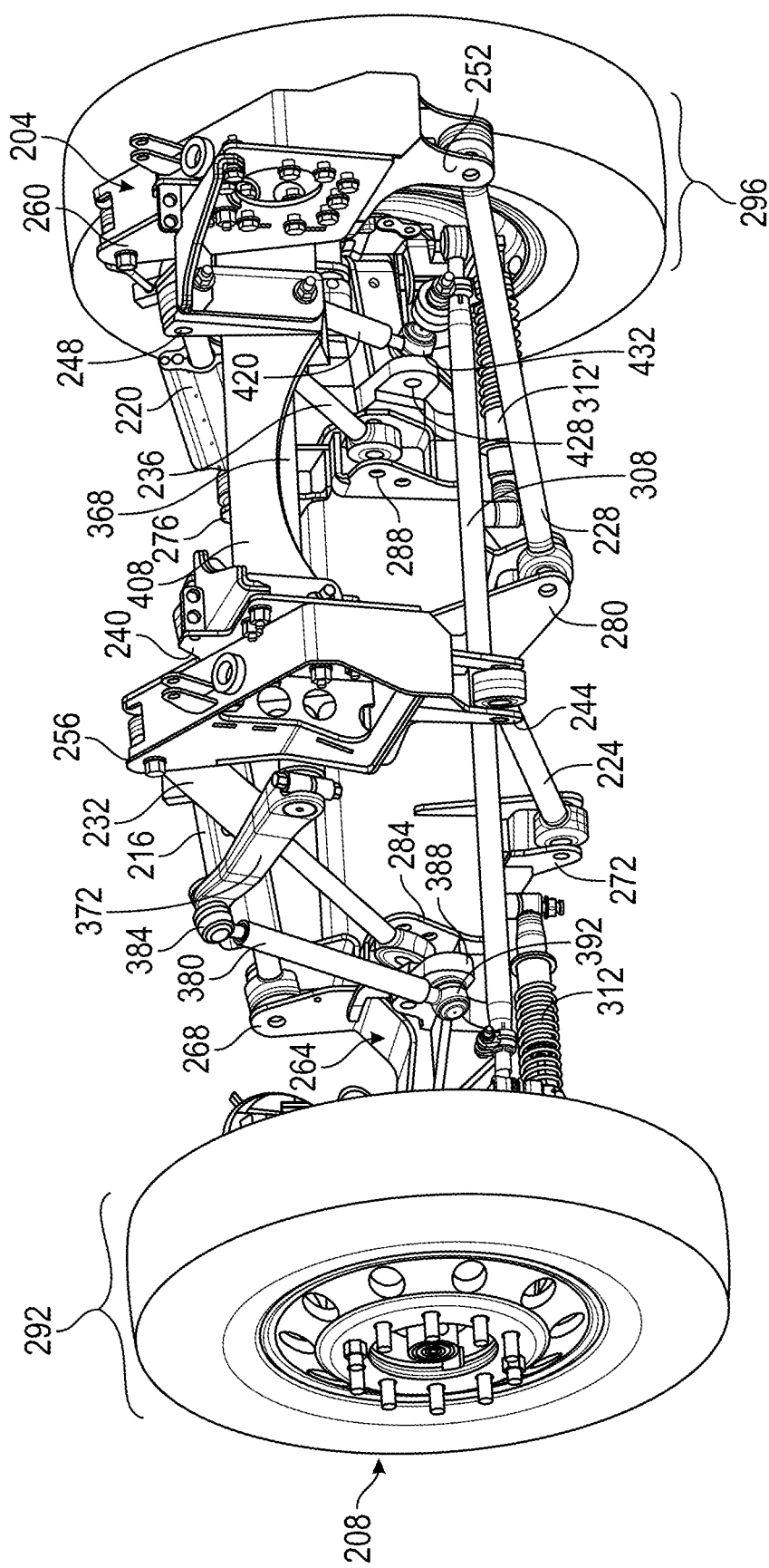
FIG. 11 is a top, right, front perspective view of the load span tag axle system of FIG. 4, according to an exemplary embodiment.
Figure 12:
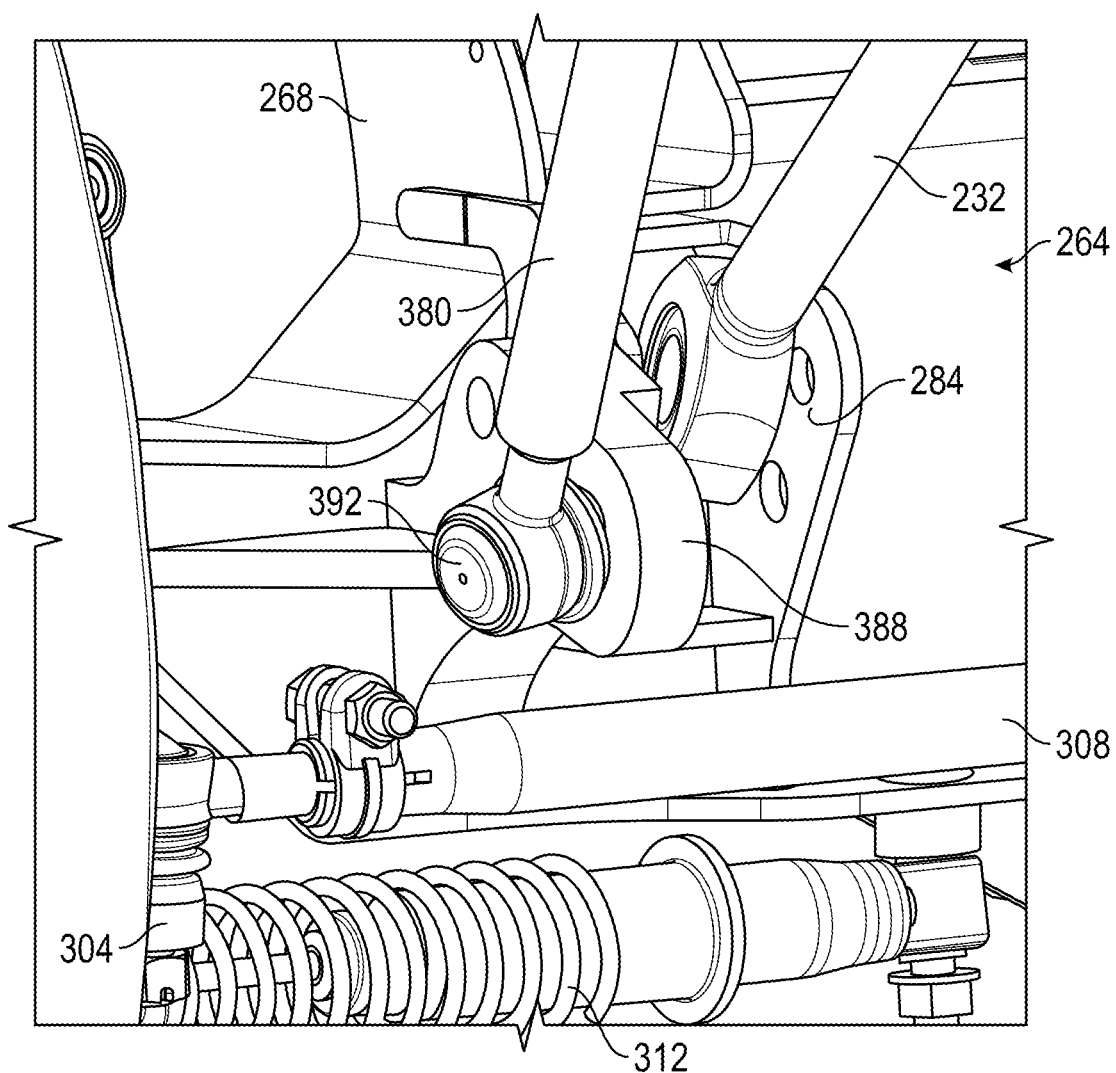
FIG. 12 is a detailed view of the load span tag axle system of FIG. 4, according to an exemplary embodiment.

The stabilizer bar system 364 can be adapted to function with different vehicles. For example, FIGS. 5-7 are directed to a first vehicle configuration (e.g., a 34' bridge distance) and FIGS. 8-10 are directed to a second vehicle configuration (e.g., a 33' bridge distance). The embodiment shown in FIGS. 8-10 is labeled with prime series numbers and the spacer 400' is geometrically different from the spacer 400 shown in FIG. 5.

The stabilizer bar system 364 is structured, so that the stabilizer bar 368 is positioned vertically between the upper mount brackets 240, 248 and the lower mount brackets 244, 252 and the lower joints 392, 432 are positioned vertically between the lower axle brackets 272, 280 and the upper axle brackets 268, 276.

In operation, the stabilizer bar system 364 increases the roll stiffness of the LSTA system 200. The right stabilizer bar arm 372 is inhibited from rotating relative to the left stabilizer bar arm 416 so that the right stabilizer bar arm 372, the stabilizer bar 368, and the left stabilizer bar arm 416 rotate together as a subassembly and the relative movement of the right wheel assembly 292 is translated to the left wheel assembly 296 therethrough. A length of the right and left stabilizer bar arms 376, 416 can be adjusted to change a torsional rate of the stabilizer bar system 364. Additionally, the bushings 404, 444 frictionally engage the stabilizer bar 368 to increase the torsional stiffness of the stabilizer bar assembly 364.

In some embodiments, the stabilizer bar 368 for the LSTA system 200 reduces static lean of the concrete mixer truck 10 at Gross Vehicle Weight (GVW) when configured with a mechanical rear tandem suspension. Vehicles with many auxiliary lift axles experience reduced vehicle roll stiffness when all auxiliary lift axles are deployed at GVW. An example is a 7-axle vehicle configured to maximize payload capacity when operated on bridges designed to Federal Bridge law requirements. Federal Bridge law requires the axle load on the rear of the truck be evenly distributed across many axles to keep the maximum axle weight of any one axle below a specified value. Maximizing payload in this situation requires shifting a significant portion of the vehicles weight from the rear tandem axles to the auxiliary lift axles (e.g., the LSTA system 200).

When the concrete mixer truck 10 is configured with a mechanical rear tandem suspension, a reduction in vehicle roll stiffness results from the reduced percentage of the vehicle weight being carried by the rear tandem. The roll stiffness of a mechanical rear tandem suspension varies based on the load carried by the suspension due to the use of rubber springs in the rear tandem suspension. The rear tandem suspension rubber springs have a markedly non-linear spring rate. When load is reduced the stiffness is reduced. The function of typical auxiliary lift axles is to carry vertical load and have the suspension be lightweight. So, by design, typical auxiliary lift axles have low roll stiffness to minimize the load going into the suspension and allow for lighter components. Consequently, on a 7-axle vehicle, with four of the axles being auxiliary lift axles, there are only two axles on the rear of the vehicle that have meaningful roll stiffness. On a 7-axle vehicle, at GVW, there is a significant roll moment generated by the vehicle payload and that is more pronounced on a vehicle with a high center of gravity like the concrete mixer truck 10. When the auxiliary lift axles are not deployed, the high load on the mechanical rear tandem suspension results in a higher roll stiffness to counteract the roll moment generated by the vehicle payload. When vehicle load is redistributed from the mechanical rear tandem to the low roll stiffness auxiliary lift axles to meet Federal Bridge law requirements, the rear tandem roll stiffness is reduced. This reduces overall vehicle roll stiffness and can result in visually objectionable static vehicle lean.

The reduction in vehicle roll stiffness when vehicle load is shifted from the mechanical rear tandem suspension to the auxiliary lift axles also causes reduced dynamic handling performance and may require additional steering wheel input from the vehicle operator.

The LSTA stabilizer bar system 364 adds roll stiffness to the rear of the concrete mixer truck 10 to offset the reduction in overall vehicle roll stiffness when the auxiliary lift axles are deployed. This reduces the static vehicle lean and improves dynamic handling performance. Locating the stabilizer bar 368 on the LSTA system 200 provides a benefit in that the additional roll stiffness provided by the stabilizer bar 368 only adds to the overall vehicle roll stiffness when the LSTA system 200 is deployed. This is beneficial because the mechanical rear tandem suspension roll stiffness is only reduced when the LSTA system 200 and other auxiliary lift axles are deployed. This ensures the additional roll stiffness is only active when it is needed. When the LSTA system 200 is not deployed the concrete mixer truck 10 maintains its ability to cross articulate and maintain traction to operate through uneven, non-symmetric terrain.

The LSTA system discussed above provides an advantageous auxiliary suspension for heavy vehicles that provides a required ground clearance, and a fast-acting suspension system that utilizes hydraulic cylinders acting as both actuators and suspension components. The parallelogram linkage provides side-to-side rigidity and a consistent kingpin caster angle during use. The steering or tracking system includes a centering feature and a connecting rod that is arranged in front of an axle frame and between linkage members to provide a compact and protected architecture.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A tag axle system, comprising:
   an axle including a right wheel assembly and a left wheel assembly;
   an actuator coupled to the axle to move the axle between a raised position and a lowered position relative to a vehicle chassis;
   a stabilizer mount plate structured to be coupled to the vehicle chassis;
   a stabilizer bar rotationally coupled to the stabilizer mount plate;
   a right stabilizer bar arm rigidly coupled to the stabilizer bar and coupled to the right wheel assembly;
   a left stabilizer bar arm rigidly coupled to the stabilizer bar and coupled to the left wheel assembly; and
   a spacer block coupled between the stabilizer mount plate and the stabilizer bar to increase a distance between the stabilizer bar and the vehicle chassis.

2. The tag axle system of claim 1, further comprising:
   a right mounting bracket coupled to the stabilizer mount plate;
   a right bushing captured within the right mounting bracket block and engaged with the stabilizer bar;
   a left mounting bracket coupled to the stabilizer mount plate; and
   a left bushing captured within the left mounting bracket block and engaged with the stabilizer bar.

3. The tag axle system of claim 2, further comprising a clamp collar coupled to the stabilizer bar and inhibiting lateral movement of the stabilizer bar relative to the right bushing and the left bushing.

4. The tag axle system of claim 1, further comprising:
   a right stabilizer bar link coupled between the right stabilizer bar arm and the right wheel assembly; and
   a left stabilizer bar link coupled between the left stabilizer bar arm and the left wheel assembly.

5. The tag axle system of claim 4, wherein the right stabilizer bar link is coupled to the right stabilizer bar arm by a right upper joint including a tapered ball joint,
   wherein the right stabilizer bar link is coupled to the right wheel assembly by a right lower joint including a tapered ball joint,
   wherein the left stabilizer bar link is coupled to the left stabilizer bar arm by a left upper joint including a tapered ball joint, and
   wherein the left stabilizer bar link is coupled to the left wheel assembly by a left lower joint including a tapered ball joint.

6. The tag axle system of claim 1, wherein the axle includes an axle beam defining a right axle stabilizer mount coupled to the right stabilizer bar arm and a left axle stabilizer mount coupled to the left stabilizer bar arm.

7. An auxiliary suspension for a heavy vehicle comprising:
   an axle including a right axle stabilizer mount and a left axle stabilizer mount;
   an actuator coupled to the axle to move the axle between a raised position and a lowered position relative to a vehicle chassis, the actuator structured to act as a suspension;
   a stabilizer bar rotationally coupled to the vehicle chassis;
   a right stabilizer bar arm rigidly coupled between the stabilizer bar and the right axle stabilizer mount;
   a left stabilizer bar arm rigidly coupled between the stabilizer bar and the left axle stabilizer mount;
   a stabilizer mount plate structured to be coupled to the vehicle chassis and to support the stabilizer bar; and
   a spacer block coupled between the stabilizer mount plate and the stabilizer bar to increase a distance between the stabilizer bar and the vehicle chassis.

8. The auxiliary suspension of claim 7, further comprising:
   a right mounting bracket;
   a right bushing captured within the right mounting bracket and engaged with the stabilizer bar;
   a left mounting bracket; and
   a left bushing captured within the left mounting bracket and engaged with the stabilizer bar.

9. The auxiliary suspension of claim 7, further comprising:

a right stabilizer bar link coupled to the right stabilizer bar arm by a right upper joint including a tapered ball joint, and coupled to the right axle stabilizer mount by a right lower joint including a tapered ball joint; and a left stabilizer bar link coupled to the left stabilizer bar arm by a left upper joint including a tapered ball joint, and coupled to the left axle stabilizer mount by a left lower joint including a tapered ball joint.

10. The auxiliary suspension of claim 7, further comprising a clamp collar coupled to the stabilizer bar and inhibiting lateral movement of the stabilizer bar relative to the vehicle chassis.

11. The auxiliary suspension of claim 7, wherein the actuator is a hydraulic linear actuator.

12. A stabilizer bar system for a load span tag axle, the stabilizer bar system comprising:
   an axle beam;
   a four-bar linkage coupling the axle beam to a vehicle chassis;
   an actuator coupled between the axle beam and the vehicle chassis and structured to actuate the axle beam between a raised position and a lowered position, and to act as a suspension;
   a stabilizer bar coupled between the vehicle chassis and the axle beam and structured to increase roll stiffness of the four-bar linkage and actuator when used as a suspension;
   a stabilizer mount plate structured to be coupled to the vehicle chassis and to support the stabilizer bar; and
   a spacer block coupled between the stabilizer mount plate and the stabilizer bar to increase a distance between the stabilizer bar and the vehicle chassis.

13. The stabilizer bar system of claim 12, further comprising:
   a right stabilizer bar arm rigidly coupled between the stabilizer bar and the axle beam; and
   a left stabilizer bar arm rigidly coupled between the stabilizer bar and the axle beam.

14. The stabilizer bar system of claim 13, further comprising:
   a right stabilizer bar link coupled to the right stabilizer bar arm by a right upper joint including a tapered ball joint, and coupled to the axle beam by a right lower joint including a tapered ball joint; and
   a left stabilizer bar link coupled to by a left upper joint including a tapered ball joint, and coupled to the axle beam by a left lower joint including a tapered ball joint.

15. The stabilizer bar system of claim 12, further comprising:
   a right mounting bracket;
   a right bushing captured within the right mounting bracket block and engaged with the stabilizer bar;
   a left mounting bracket; and
   a left bushing captured within the left mounting bracket and engaged with the stabilizer bar.

* * * * *